US012606011B2

(12) United States Patent   (10) Patent No.: US 12,606,011 B2
Nishioka et al.   (45) Date of Patent: Apr. 21, 2026

(54) GRILLE SHUTTER

(71) Applicant: TOYOTA JIDOSHA KABUSHIKI KAISHA, Toyota (JP)

(72) Inventors: Hideo Nishioka, Toyota (JP); Hiroki Sawada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 316 days.

(21) Appl. No.: 18/366,087

(22) Filed: Aug. 7, 2023

(65) Prior Publication Data

US 2024/0131921 A1    Apr. 25, 2024
US 2024/0227543 A9    Jul. 11, 2024

(30) Foreign Application Priority Data

Oct. 19, 2022    (JP) ................................. 2022-167795

(51) Int. Cl.
B60K 11/08    (2006.01)

(52) U.S. Cl.
CPC .................................. B60K 11/085 (2013.01)

(58) Field of Classification Search
CPC ................................................ B60K 11/085
USPC ......................................................... 180/68.1
See application file for complete search history.

(56) References Cited

U.S. PATENT DOCUMENTS 10,166,858 B2 *  1/2019  Ibañez ..................... F16H 37/12
10,696,152 B2 *  6/2020  Nam ................... B60K 11/085

| | | | | |
|---|---|---|---|---|
| 11,433,761 B2 * | 9/2022 | Komatsubara | ....... | B60K 11/085 |
| 2010/0243352 A1 * | 9/2010 | Watanabe | ............ | B60K 11/085 |
| | | | | 180/68.1 |
| 2011/0226541 A1 * | 9/2011 | Hori | ..................... | B60K 11/085 |
| | | | | 180/68.1 |
| 2012/0132474 A1 * | 5/2012 | Charnesky | ........... | B60K 11/085 |
| | | | | 49/77.1 |
| 2013/0095740 A1 * | 4/2013 | Hori | ..................... | B60K 11/085 |
| | | | | 454/152 |
| 2013/0146375 A1 * | 6/2013 | Lee | ..................... | B60K 11/085 |
| | | | | 180/68.1 |
| 2015/0020758 A1 * | 1/2015 | Hosono | ..................... | F01P 7/02 |
| | | | | 123/41.04 |
| 2017/0291485 A1 * | 10/2017 | Yasui | ................... | B60K 11/085 |
| 2021/0284011 A1 * | 9/2021 | Grebel | ................ | B60K 11/085 |

FOREIGN PATENT DOCUMENTS

| JP | H06-337613 A | 12/1994 |
|---|---|---|
| JP | 2014-189245 A | 10/2014 |

* cited by examiner

*Primary Examiner* — Hau V Phan

(74) *Attorney, Agent, or Firm* — SoraIP, Inc.

(57)    ABSTRACT

The plurality of movable fins includes at least a first movable fin coupled to the actuator and a second movable fin coupled to the first movable fin via a time difference link. The time difference link does not interlock the second movable fin with respect to the first movable fin while the first movable fin rotates from the closed position to the predetermined intermediate position, and interlocks the second movable fin with respect to the first movable fin while the first movable fin rotates from the intermediate position to the open position.

4 Claims, 3 Drawing Sheets

GRILLE SHUTTER

CROSS-REFERENCE TO RELATED APPLICATION

This application claims priority to Japanese Patent Application No. 2022-167795 filed on Oct. 19, 2022, incorporated herein by reference in its entirety.

BACKGROUND

1. Technical Field

The technology disclosed herein relates to a grille shutter for a vehicle.

2. Description of Related Art

Japanese Unexamined Patent Application Publication No. 2014-189245 (JP 2014-189245 A) describes a grille shutter. The grille shutter includes a plurality of movable fins and an actuator for rotationally driving the movable fins.

SUMMARY

In general, the movable fins are rotationally driven by a common actuator. This can reduce the number of actuators required. On the other hand, when any one of the movable fins becomes non-rotatable (also referred to as fixed) from the closed position due to foreign matter, icing, or the like, the other movable fins also become non-rotatable. As a result, an opening (also referred to as a front grille or a grille opening) for taking in the traveling wind cannot be opened at all, and there is a possibility that a cooling target such as a radiator is overheated. The present specification provides a technique that can avoid or suppress such problems.

The technique disclosed herein is embodied in a grille shutter installed in an opening of a vehicle that takes in traveling wind. The grille shutter includes: a plurality of movable fins arranged in a vehicle up-down direction in the opening, and each rotatably supported about an axis parallel to a vehicle right-left direction; and an actuator for rotationally driving the movable fins from a closed position in which the opening is closed to an open position in which the opening is opened. The movable fins at least include a first movable fin connected to the actuator, and a second movable fin connected to the first movable fin via a time difference link. The time difference link is configured not to cause the second movable fin to be interlocked with the first movable fin while the first movable fin rotates from the closed position to a predetermined intermediate position, and configured to cause the second movable fin to be interlocked with the first movable fin while the first movable fin rotates from the intermediate position to the open position.

In the above-described configuration, when the actuator rotationally drives the first movable fin, the second movable fin is rotationally driven later. Even when the second movable fin is fixed, the first movable fin can rotate to the intermediate position, and the opening of the vehicle that takes in the traveling wind can be partially opened. As a result, overheating of a cooling target such as a radiator can be avoided or suppressed.

Here, the positional relationship between the first movable fin and the second movable fin is not particularly limited. In particular, a movable fin that is easy to fix and a movable fin that is difficult to fix may differ depending on the specific structure of the vehicle. Therefore, among the plurality of movable fins, a movable fin that is easy to be fixed is specified by an experiment or the like, and the movable fin may be a second movable fin, and the other movable fin may be a first movable fin.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
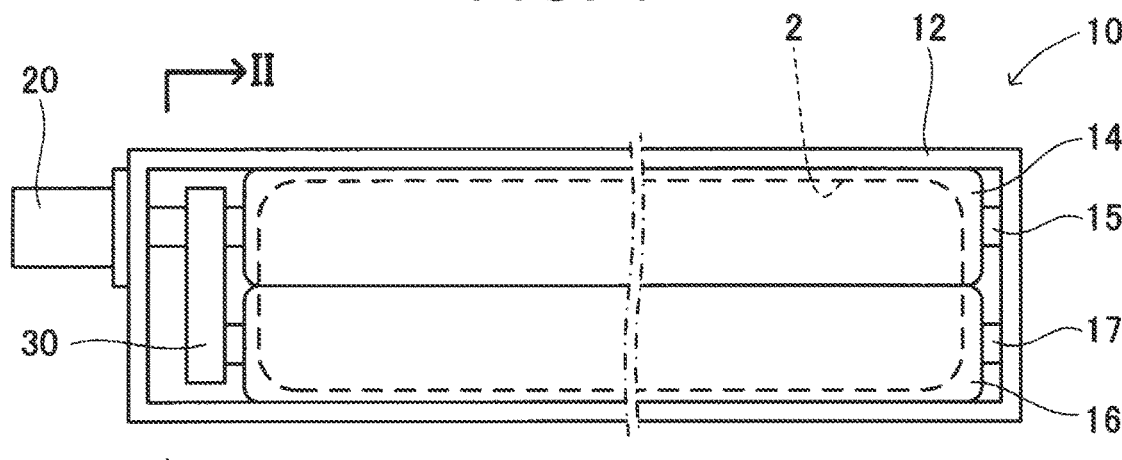
FIG. 1 is a rear view showing a grille shutter 10 according to an embodiment.
Figure 1:
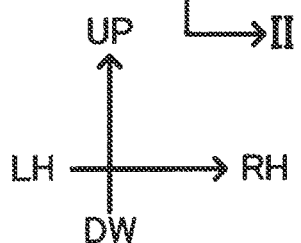

In an embodiment of the present technology, the second movable fin may be positioned at a lowermost position among the plurality of movable fins. Although some exceptions have been identified, in general, since the movable fin located at the lowest position is most likely to be fixed, the movable fin may be a second movable fin interlocked with a delay.

In an embodiment of the present technology, the second movable fin may rotate at a higher speed than the first movable fin while the first movable fin rotates from the intermediate position to the open position. According to such a configuration, even when the second movable fin is rotationally driven behind the first movable fin, the second movable fin can be sufficiently rotated up to an angle equivalent to the first movable fin, for example.

In an embodiment of the present technology, one end of the time difference link may be rotatably coupled to a first coupling shaft fixed to the first movable fin. The other end of the time difference link may be rotatably coupled to a second coupling shaft fixed to the second movable fin and movable by a predetermined distance in a longitudinal direction of the time difference link. While the first movable fin rotates from the closed position to the intermediate position, movement of the second connecting shaft in the longitudinal direction with respect to the time difference link may be permitted, and while the first movable fin rotates from the intermediate position to the open position, movement of the second connecting shaft in the longitudinal direction with respect to the time difference link may be prohibited. According to such a configuration, when the actuator rotationally drives the first movable fin, the second movable fin can be rotationally driven later.

In the above-described embodiment, a distance from a rotation axis of the second movable fin to the second connection shaft may be shorter than a distance from a rotation axis of the first movable fin to the first connection shaft. According to such a configuration, the second movable fin can be rotated at a higher speed than the first movable fin while the first movable fin is rotated from the intermediate position to the open position.

In an embodiment of the present technology, the time difference link may include a first link and a second link. In this case, one end of the first link may be rotatably coupled to a first coupling shaft fixed to the first movable fin. The other end of the first link may be rotatably connected to one end of the second link. The other end of the second link may be rotatably coupled to a second coupling shaft fixed to the second movable fin by a predetermined angle. The rotation of the second link with respect to the second movable fin may be allowed while the first movable fin rotates from the closed position to the intermediate position, and the rotation of the second link with respect to the second movable fin may be prohibited while the first movable fin rotates from the intermediate position to the open position. According to such a configuration, when the actuator rotationally drives the first movable fin, the second movable fin can be rotationally driven later.

In the above-described embodiment, a distance from a rotation axis of the second movable fin to the second connection shaft may be shorter than a distance from a rotation axis of the first movable fin to the first connection shaft. According to such a configuration, the second movable fin can be rotated at a higher speed than the first movable fin while the first movable fin is rotated from the intermediate position to the open position.

EXAMPLES

The grille shutter 10 of the embodiment will be described with reference to the drawings. The grille shutter 10 of the present embodiment is employed in a vehicle such as an electrified vehicle, for example, and is installed in the opening 2 of the vehicle that takes in the traveling wind. Although not particularly limited, the opening 2 is located at the front end portion of the vehicle and opens forward. This type of opening 2 is also referred to as a front grille or a grille opening. The traveling wind taken in from the opening 2 cools a cooling target such as a radiator disposed in a front compartment of the vehicle.

Here, the direction FR in the drawing indicates the front in the vehicle front-rear direction, and the direction RR in the drawing indicates the rear in the vehicle front-rear direction. The direction LH in the drawing indicates the left in the vehicle left-right direction, and the direction RH in the drawing indicates the right in the vehicle left-right direction. A direction UP in the drawing indicates an upper portion in the vehicle up-down direction, and a direction DW in the drawing indicates a lower portion in the vehicle up-down direction.

Figure 2:
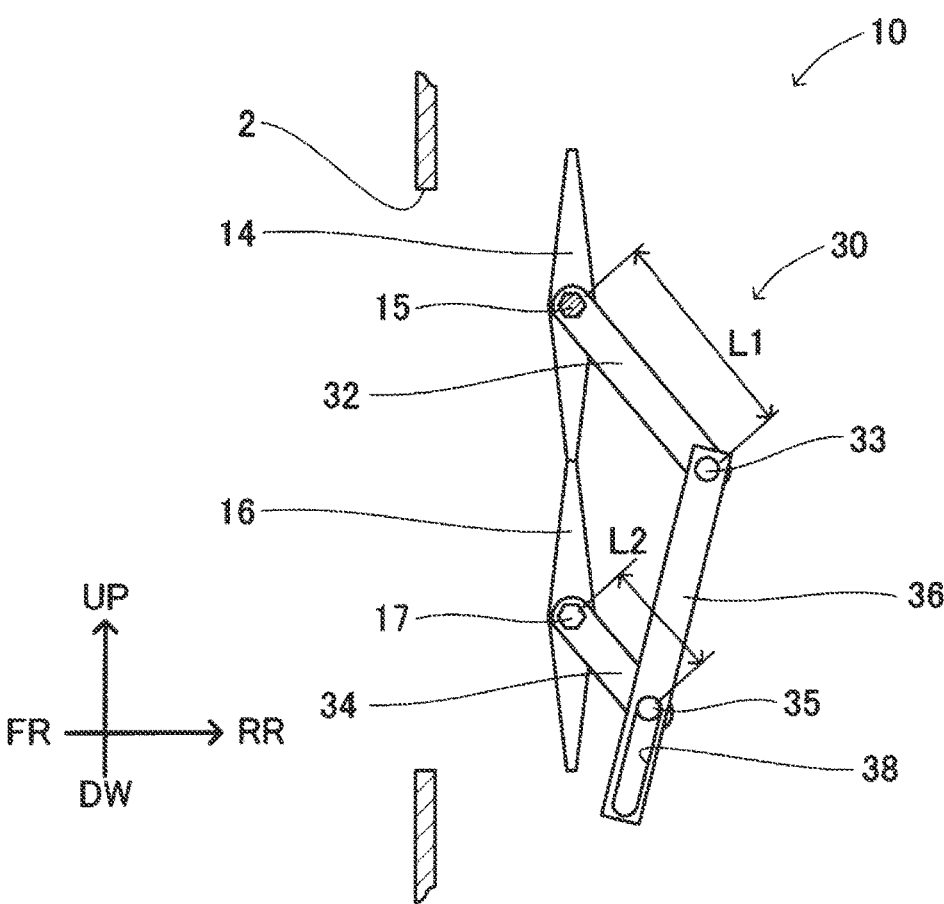
FIG. 2 is a cross-sectional view taken along II-II line in FIG. 1.

As shown in FIGS. 1 and 2, the grille shutter 10 includes a frame 12, a plurality of movable fins 14 and 16, an actuator 20 that drives the plurality of movable fins 14 and 16, and a transmission mechanism 30 that transmits power of the actuator 20 to the movable fins 14 and 16. The plurality of movable fins 14 and 16, the actuator 20, and the transmission mechanism 30 are integrally supported by the frame 12. Although not particularly limited, the actuator 20 may be an electric actuator such as an electric motor.

The plurality of movable fins 14 and 16 are arranged in the vehicle vertical direction at the opening 2 of the vehicle. Each of the movable fins 14 and 16 is rotatably supported around rotation shafts 15 and 17 parallel to the vehicle left-right direction. As will be described in detail later, the plurality of movable fins 14 and 16 are rotationally driven by the actuator 20 between a closed position in which the opening 2 is closed (see FIG. 3A) and an open position in which the opening 2 is opened (see FIG. 3C). Although not particularly limited, each of the movable fins 14 and 16 is substantially parallel to the vehicle vertical direction when in the closed position, and is substantially parallel to the vehicle front-rear direction when in the open position.

The plurality of movable fins 14 and 16 includes a first movable fin 14 and a second movable fin 16. The first movable fin 14 is connected to the actuator 20 via the transmission mechanism 30. Thus, the first movable fin 14 is directly rotationally driven by the actuator 20. On the other hand, the second movable fin 16 is connected to the first movable fin 14 via the transmission mechanism 30. Thus, the second movable fin 16 is configured to be rotationally driven in conjunction with the first movable fin 14. Although not particularly limited, among the plurality of movable fins 14 and 16, the second movable fin 16 is positioned at the lowermost position, and the first movable fin 14 is positioned above the second movable fin 16. The number of the movable fins 14 and 16 is not limited to two.

The transmission mechanism 30 includes a first arm 32 fixed to the first movable fin 14, a second arm 34 fixed to the second movable fin 16, and a time difference link 36 connecting the first arm 32 and the second arm 34 to each other.

One end of the first arm 32 is fixed to the rotation shaft 15 of the first movable fin 14, and both the first arm 32 and the first movable fin 14 rotate integrally around the rotation shaft 15 of the first movable fin 14. On the other hand, the other end of the first arm 32 is connected to one end of the time difference link 36. Specifically, a first connecting shaft 33 is provided at the other end of the first arm 32, and one end of the time difference link 36 is rotatably coupled to the first connecting shaft 33.

One end of the second arm 34 is fixed to the rotation shaft 17 of the second movable fin 16. Both the second arm 34 and the second movable fin 16 rotate integrally around the rotation shaft 17 of the second movable fin 16. On the other hand, the other end of the second arm 34 is connected to the other end of the time difference link 36. Specifically, the second connecting shaft 35 is provided at the other end of the second arm 34. The other end of the time difference link 36 is rotatably connected to the second connecting shaft 35. The first connecting shaft 33 and the second connecting shaft 35 are parallel to each other, and are also parallel to the rotation shafts 15 and 17 of the first movable fin 14 and the second movable fin 16.

Here, the other end of the time difference link 36 is not only rotatable with respect to the second connecting shaft 35. The other end of the time difference link 36 is movably connected along the longitudinal direction of the time difference link 36 by a predetermined distance. Specifically, an elongated hole 38 is formed at the other end of the time difference link 36. The second connecting shaft 35 of the second arm 34 is loosely fitted in the elongated hole 38. The second connecting shaft 35 of the second arm 34 is slidable in the elongated hole 38 of the time difference link 36. As a result, the other end of the time difference link 36 can be displaced relative to the second connecting shaft 35 by the length of the elongated hole 38 in the longitudinal direction.

The first arm 32 and the second arm 34 have different lengths. Specifically, a distance L2 between the rotation shaft 17 of the second movable fin 16 and the second connecting shaft 35 is shorter than a distance L1 between the rotation shaft 15 of the first movable fin 14 and the first connection shaft 33.

Figure 3C:
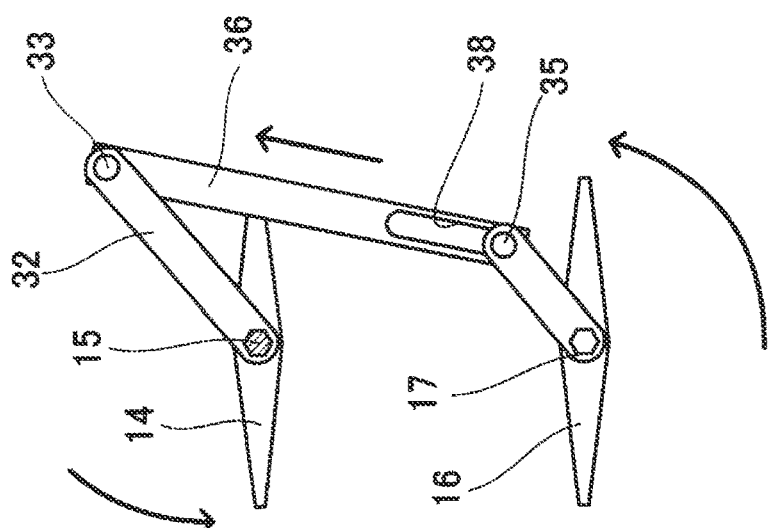
FIG. 3C is a view for explaining the operation of the movable fins 14 and 16, showing the two movable fins 14 and 16 in an open position.
Figure 3B:
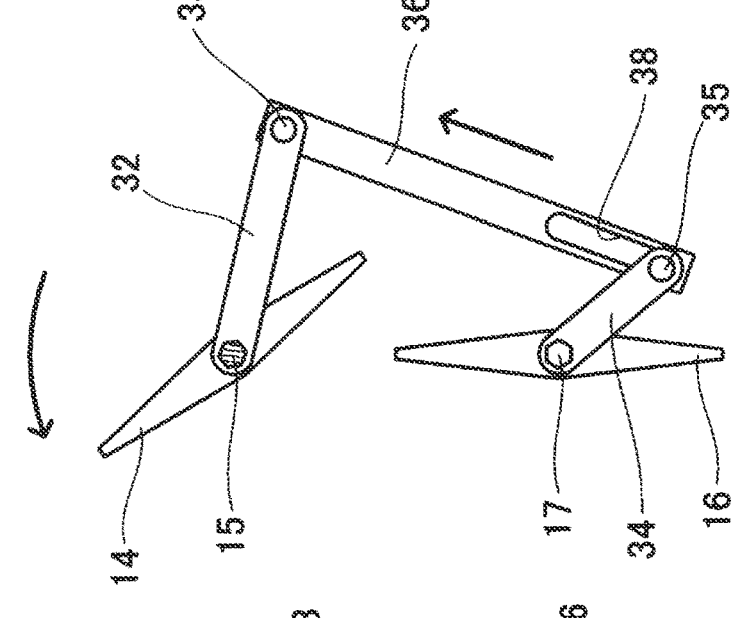
FIG. 3B is a view for explaining the operation of the movable fins 14 and 16, showing the first movable fin 14 in an intermediate position and the second movable fin 16 in a closed position.
Figure 3A:
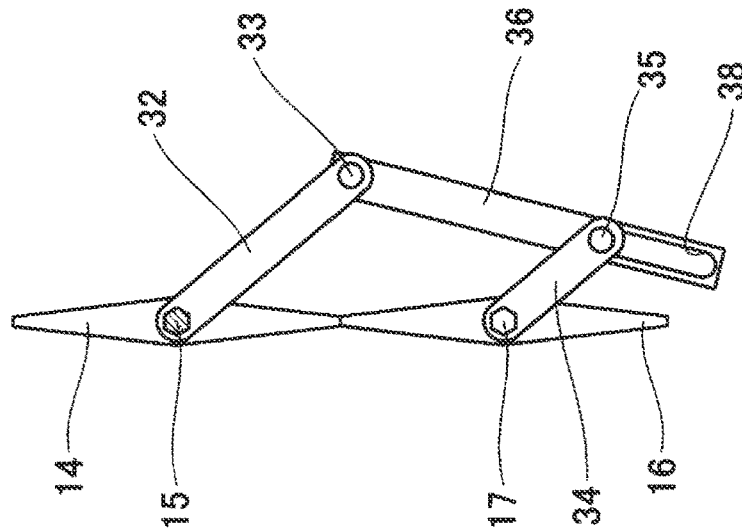
FIG. 3A is a view illustrating the operation of the movable fins 14 and 16, showing the two movable fins 14 and 16 in a closed position.

According to the above-described configuration, as shown in FIG. 3, when the actuator 20 rotationally drives the first movable fin 14, the second movable fin 16 is rotationally driven later. That is, as shown in FIGS. 3A and 3B, while the first movable fin 14 rotates from the closed position to the predetermined intermediate position, the second connecting shaft 35 of the second movable fin 16 slides in the elongated hole 38 of the time-difference link 36. As a result, the second movable fin 16 does not interlock with the first movable fin 14, and only the first movable fin 14 is rotationally driven. Thus, even if the second movable fin 16 is fixed, the first movable fin 14 can be rotationally driven to the intermediate position to partially open the opening 2.

Thereafter, as shown in FIGS. 3B and 3C, while the first movable fin 14 rotates from the intermediate position to the open position, the second connecting shaft 35 of the second movable fin 16 abuts against the end of the elongated hole 38 of the time-difference link 36. As a result, the above-described sliding movement is prohibited, and the second movable fin 16 is rotationally driven in conjunction with the first movable fin 14. Thus, if the second movable fin 16 is not fixed, the second movable fin 16 also moves to the open position.

As described above, the distance L2 between the rotation shaft 17 of the second movable fin 16 and the second connecting shaft 35 is shorter than the distance L1 between the rotation shaft 15 of the first movable fin 14 and the first connection shaft 33. According to such a configuration, while the first movable fin 14 rotates from the intermediate position to the open position, the second movable fin 16 rotationally driven behind the first movable fin 14 can be rotated at a higher speed (more precisely, at a larger angular velocity) than the first movable fin 14. As a result, the second movable fin 16 can be sufficiently rotated to an angle equivalent to that of the first movable fin 14.

Figure 4:
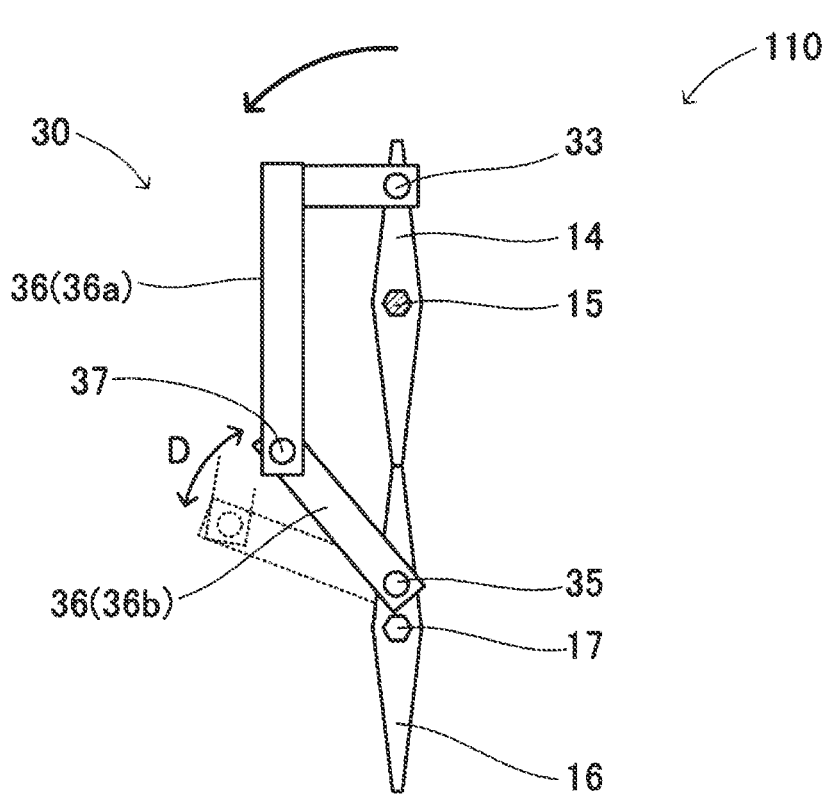
FIG. 4 is a diagram showing a main part of a grille shutter 110 according to another embodiment.

A grille shutter 110 according to another embodiment will be described with reference to FIG. 4. FIG. 4 shows a main part of the grille shutter 110. As shown in FIG. 4, in the grille shutter 110 of the present embodiment, the configuration of the transmission mechanism 30 is changed as compared with the grille shutter 10 of the above-described embodiment. Specifically, the time-difference link 36 has a first link 36a and a second link 36b.

One end of the first link 36a is rotatably coupled to a first connecting shaft 33 fixed to the first movable fin 14. The other end of the first link 36a is rotatably coupled to one end of the second link 36b via a third coupling shaft 37. The other end of the second link 36b is rotatably connected to the second connecting shaft 35 fixed to the second movable fin 16 by a predetermined angle D.

In the grille shutter 110 of the present embodiment, the rotation angle of the second link 36b is less than the predetermined angle D while the first movable fin 14 rotates from the closed position to the intermediate position. Accordingly, the second link 36b is allowed to rotate with respect to the second movable fin 16. When the first movable fin 14 rotates to the intermediate position, the rotation angle of the second link 36b reaches the predetermined angle D. Consequently, while the first movable fin 14 rotates from the intermediate position to the open position, rotation of the second link 36b with respect to the second movable fin 16 is prohibited, and both the second link 36b and the second movable fin 16 rotate integrally.

As described above, also in the grille shutter 110 of the present embodiment, the time difference link 36 does not interlock the second movable fin 16 with the first movable fin 14 while the first movable fin 14 rotates from the closed position to the intermediate position. Thus, even if the second movable fin 16 is fixed, the actuator 20 can rotate the first movable fin 14 to the intermediate position, and can partially open the opening 2 of the vehicle that takes in traveling wind. The time difference link 36 can interlock the second movable fin 16 with the first movable fin 14 while the first movable fin 14 rotates from the intermediate position to the open position.

Also in the grille shutter 110 of the present embodiment, the distance from the rotation shaft 17 of the second movable fin 16 to the second connecting shaft 35 is shorter than the distance from the rotation shaft 15 of the first movable fin 14 to the first connection shaft 33. Thus, while the first movable fin 14 rotates from the intermediate position to the open position, the second movable fin 16 rotationally driven behind the first movable fin 14 can be rotated at a higher speed (more precisely, at a larger angular velocity) than the first movable fin 14.

What is claimed is:

1. A grille shutter installed in an opening of a vehicle that takes in traveling wind, the grille shutter comprising:
   a plurality of movable fins arranged in a vehicle up-down direction in the opening, each fin of the plurality of the movable fins being rotatably supported about an axis, the axis being parallel to a vehicle right-left direction; and
   an actuator configured to rotationally drive the plurality of movable fins from a closed position to an open position, wherein
   the opening is closed in a case where the plurality of movable fins are positioned at the closed position,
   the opening is opened in a case where the plurality of movable fins are positioned at the opening position,
   the plurality of movable fins at least include
      a first movable fin connected to the actuator, and
      a second movable fin connected to the first movable fin via a time difference link,
   the time difference link is configured to
      cause the second movable fin not to be interlocked with the first movable fin in a case where the first movable fin rotates from the closed position to a predetermined intermediate position, and
      cause the second movable fin to be interlocked with the first movable fin in a case where the first movable fin rotates from the intermediate position to the open position,
   a first end of the time difference link is rotatably connected to a first connecting shaft, the first connecting shaft being fixed to the first movable fin,
   a second end of the time difference link is rotatably connected to a second connecting shaft, the second connecting shaft being fixed to the second movable fin and being movable by a predetermined distance along a longitudinal direction of the time difference link,
   movement of the second connecting shaft relative to the time difference link in the longitudinal direction is permitted in a case where the first movable fin rotates from the closed position to the intermediate position,
   the movement of the second connecting shaft relative to the time difference link in the longitudinal direction is prohibited in a case where the first movable fin rotates from the intermediate position to the open position, and
   a distance from a rotation shaft of the second movable fin to the second connecting shaft is shorter than a distance from a rotation shaft of the first movable fin to the first connecting shaft.

2. The grille shutter according to claim 1, wherein the second movable fin is positioned at a lowermost position among the plurality of movable fins.

3. The grille shutter according to claim 1, wherein the second movable fin rotates at a higher speed than the first movable fin in a case where the first movable fin rotates from the intermediate position to the open position.

4. The grille shutter according to claim 1, wherein the time difference link includes a first link and a second link, a first end of the first link is rotatably connected to the first connecting shaft, a second end of the first link is rotatably connected to a first end of the second link, a second end of the second link is rotatably connected by a predetermined angle to the second connecting shaft, the second connecting shaft being fixed to the second movable fin, rotation of the second link relative to the second movable fin is permitted in a case where the first movable fin rotates from the closed position to the intermediate position, and the rotation of the second link relative to the second movable fin is prohibited in a case where the first movable fin rotates from the intermediate position to the open position.

\*   \*   \*   \*   \*